(12) United States Patent
Oien et al.

(10) Patent No.: US 12,252,399 B2
(45) Date of Patent: Mar. 18, 2025

(54) BLEACHING TOWER AND METHOD FOR NITRIC ACID PRODUCTION

(71) Applicant: YARA INTERNATIONAL ASA, Oslo (NO)

(72) Inventors: Halvor Oien, Porsgrunn (NO); Arnulf Idar Melgard, Skien (NO)

(73) Assignee: YARA INTERNATIONAL ASA, Oslo (NO)

( * ) Notice: Subject to any disclaimer, the term of this patent is extended or adjusted under 35 U.S.C. 154(b) by 801 days.

(21) Appl. No.: 17/422,682

(22) PCT Filed: Feb. 14, 2020

(86) PCT No.: PCT/EP2020/053863
§ 371 (c)(1),
(2) Date: Jul. 13, 2021

(87) PCT Pub. No.: WO2020/169465
PCT Pub. Date: Aug. 27, 2020

(65) Prior Publication Data
US 2022/0119258 A1    Apr. 21, 2022

(30) Foreign Application Priority Data
Feb. 22, 2019    (EP) .................................... 19158885

(51) Int. Cl.
*C01B 21/40*    (2006.01)
*B01D 53/14*    (2006.01)
*B01D 53/18*    (2006.01)

(52) U.S. Cl.
CPC .......... *C01B 21/40* (2013.01); *B01D 53/1418* (2013.01); *B01D 53/185* (2013.01); *B01D 2257/40* (2013.01)

(58) Field of Classification Search
CPC .... C01B 21/40; B01D 53/1418; B01D 53/185
See application file for complete search history.

(56) References Cited

U.S. PATENT DOCUMENTS

| | | | |
|---|---|---|---|
| 3,579,298 A | 5/1971 | O'Brien et al. | |
| 2014/0065040 A1* | 3/2014 | Katz | B01D 53/1456 423/210 |

FOREIGN PATENT DOCUMENTS

| | | |
|---|---|---|
| DE | 4034752 A1 | 5/1992 |
| DE | 4035205 A1 | 5/1992 |

(Continued)

OTHER PUBLICATIONS

Anonymous: "Core-Tray Column Internals", Mar. 27, 2018, pp. 1-2.
(Continued)

*Primary Examiner* — James A Fiorito
(74) *Attorney, Agent, or Firm* — Dilworth IP, LLC

(57) ABSTRACT

A vertical bleaching tower for removing dissolved nitrogen oxides from an aqueous nitric acid solution using a stripping gas such as air, nitrogen, oxygen or combinations thereof in a process for producing nitric acid, comprising a structured packing; a liquid distributor comprising a feed box having a serrated weir for distribution of the aqueous nitric acid solution comprising the dissolved nitrogen oxides through upward-pointing serrations of the serrated weir into perforated trays of the liquid distributor and located above the structured packing for distributing the aqueous nitric acid solution comprising the dissolved nitrogen oxides to the structured packing; an inlet and outlet, both suitable for aqueous nitric acid solution; and an inlet and outlet, both suitable for the stripping gas. The present invention further comprises a bleaching method for removing dissolved nitrogen oxides from an aqueous nitric acid solution in a vertical bleaching tower.

16 Claims, 3 Drawing Sheets

(56) References Cited

FOREIGN PATENT DOCUMENTS

| | | |
|---|---|---|
| EP | 2295375 A1 | 3/2011 |
| WO | 02/083260 A2 | 10/2002 |

OTHER PUBLICATIONS

Anonymous: "Separation Technology Unit operations Processes Services", Jan. 1, 2000, pp. 1-12.
International Preliminary Report on Patentability in related PCT/EP2020/053863, dated Nov. 4, 2020, 9 pages.
International Search Report and Written Opinion in related PCT/EP2020/053863, dated May 26, 2020, 17 pages.

* cited by examiner

BLEACHING TOWER AND METHOD FOR NITRIC ACID PRODUCTION

TECHNICAL FIELD

The present invention relates to a vertical bleaching tower for removing dissolved nitrogen oxides from an aqueous nitric acid solution comprising said nitrogen oxides, in a process for producing nitric acid, and a bleaching method for removing dissolved nitrogen oxides from an aqueous nitric acid solution comprising said nitrogen oxides, using a stripping gas such as air, nitrogen, oxygen or combinations thereof, in a process for producing nitric acid. More particularly, the invention relates to a vertical bleaching tower and bleaching method where unreacted dissolved nitrogen oxides in a produced aqueous nitric acid solution are removed with a stripping gas such as air, nitrogen, oxygen or combinations thereof, using a structured packing and liquid distributor which is new for a vertical bleaching tower.

Background of the Invention

Pure nitric acid is a clear, colourless liquid with a strong odour. Nitric acid is produced in large quantities principally by catalytic oxidation of ammonia (Ostwald process). Ammonia is converted to nitric acid in two stages. The ammonia is first oxidized on platinum gauzes, producing nitric oxide and water, see formula 1:

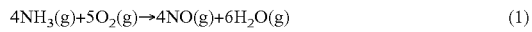

$$4NH_3(g)+5O_2(g) \rightarrow 4NO(g)+6H_2O(g) \quad (1)$$

The reaction product from (1), nitric oxide (NO), is then oxidized to nitrogen dioxide $NO_2(g)$ and further to dinitrogen tetroxide $N_2O_4$ (g):

$$2NO(g)+O_2(g) \rightarrow 2NO_2(g) \quad (2)$$

$$2NO_2(g) \rightarrow N_2O_4(g) \quad (3)$$

By absorption in water, the nitrogen oxides (defined herein as at least comprising nitrogen dioxide and dinitrogen tetroxide) are converted to nitric acid and nitric oxide:

$$3NO_2(g)+H_2O(l) \rightarrow 2HNO_3(aq)+NO(g) \quad (4)$$

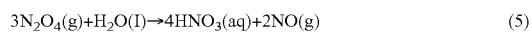

$$3N_2O_4(g)+H_2O(l) \rightarrow 4HNO_3(aq)+2NO(g) \quad (5)$$

Weak nitric acid which is up to 68% (azeotrope) is obtained.

Through a rectification process the concentration of nitric acid can be increased up to 99% concentrated nitric acid.

The total reaction is given by the following formula:

$$NH_3+2O_2 \rightarrow HNO_3+H_2O \quad (6)$$

The main process units in a nitric acid production plant, include an ammonia converter (conversion of ammonia into nitric oxide using oxygen), a cooler and condenser apparatus, an absorption tower (absorption of dinitrogen tetroxide in water) and a bleaching tower (removal of unreacted dissolved nitrogen dioxide ($NO_2$) and dinitrogen tetroxide ($N_2O_4$) gases from aqueous nitric acid solution giving it its typical brownish colour). In addition, a compressor for a stripping gas substantially devoid of nitrogen oxide gases, such as air, nitrogen, oxygen or combinations thereof, and equipment for treating the tail gas are comprised. When the stripping gas is air, the total air from the air compressor is split into a first and second air flow. The first air flow is fed as primary air to the ammonia converter and the second air flow is fed as secondary air to the bleaching tower. In another embodiment, the secondary air may also be ambient air at atmospheric pressure.

The bleaching stage of the nitric acid production process is performed in a bleaching tower. Conventional design of a bleaching tower is a vertical column filled with trays or with random packing. The aqueous nitric acid solution containing dissolved nitrogen dioxide ($NO_2$) and dinitrogen tetroxide ($N_2O_4$) gases is distributed in the top of the vertical column. A conventional liquid distributor contains an inlet of the aqueous nitric acid solution stream delivering the aqueous nitric acid solution to a plurality of trays. Examples of liquid distributors are spray nozzles, circular pipes with holes and feed boxes. To support packings and aid in gas/liquid distribution, packing support plates or grids may be used.

In the bleaching tower, a stripping gas substantially devoid of nitrogen oxide gases, such as air, nitrogen, oxygen or combinations thereof, is blown counter-currently to a yellow/brown colored aqueous nitric acid solution traveling downwards through the bleaching tower's trays, in order to remove the dissolved nitrogen dioxide ($NO_2$) and dinitrogen tetroxide ($N_2O_4$) gases (and possibly non-dissolved nitrogen oxide gasses carried along with the stream of aqueous nitric acid solution), not converted to $HNO_3$ (nitric acid), and in order to avoid formation of nitrous acid ($HNO_2$), the levels of which should be controlled in case the nitric acid is used for the synthesis of ammonium nitrate, mineral fertilizer or other chemical products. The aqueous nitric acid solution leaving the bleaching tower bottom outlet should be colorless. This indicates that the level of dissolved nitrogen dioxide ($NO_2$) and dinitrogen tetroxide ($N_2O_4$) gases is sufficiently reduced. The removed nitrogen oxides, contained in the stream of stripping gas, are leaving the bleaching tower through the top stripping gas outlet. The removed nitrogen oxides may be returned to the nitric acid process to a compressor for the nitrogen oxide gases, located upstream the absorption tower, or directly to the absorption tower for conversion of the removed nitrogen oxides to nitric acid. The stripping gas used may be ambient air at atmospheric pressure. It is important that the stripping gas is substantially devoid from nitrogen oxide gases ($NO_2$, $N_2O_4$, generally NOx) as this would decrease the efficiency of the process for removing nitrogen oxides from an aqueous nitric acid solution.

The bleaching tower is a known restriction unit (bottle neck) in the nitric acid production. The problem is to meet the specifications of the product acid at high load. The design of the column should ensure uniform distribution and contact between the upward flowing gas (stripping gas) and the downward liquid stream (aqueous nitric acid solution) through the entire column. The object of the present invention is to obtain increased nitric acid production capacity and reduce the amount of stripping gas used, while at least maintaining the quality of the aqueous nitric acid solution, i.e. the low level of dissolved nitrogen dioxide ($NO_2$) and dinitrogen tetroxide ($N_2O_4$) gases.

Surprisingly, the inventors have now found that a structured packing in the bleaching tower in combination with a liquid distributor comprising a feed box having a serrated weir for distribution of liquid through upward-pointing serrations of the serrated weir into perforated trays of the liquid distributor, can meet one or more objects of the present invention.

WO 02/083260 A2 (Koch-Glitsch LP, 24 Oct. 2002) discloses a liquid distributor in a mass transfer column that distributes liquid to an underlying mass transfer bed containing one or more random, grid or structured packing elements. A serrated weir is used for distribution of liquid through downward-pointing serrations of the serrated weir into the underlying mass transfer bed. The use in a bleaching tower in a bleaching stage of the nitric acid production process is not mentioned, nor is the use of a serrated weir for distribution of liquid through upward-pointing serrations of the serrated weir into perforated trays of the liquid distributor.

U.S. Pat. No. 4,816,191 (Koch Engineering Company, 28 Mar. 1989) discloses a liquid distributor for a gas-liquid contact column which also comprises a serrated weir for distribution of liquid through downward-pointing serrations of the serrated weir into the underlying column. Structured packings are not mentioned.

DE 4035205 A1 (Curtius, 7 May 1992) discloses a vertical countercurrent washing column comprising a packing which can be a structured packing; a liquid distributor located above the packing; an aqueous nitric acid solution inlet and outlet; and a gas inlet and outlet. The washing column does not disclose a liquid distributor according to the present invention. Furthermore, the washing column is used to remove gaseous nitrogen oxide from flue gas using diluted nitric acid to produce nitrogen dioxide, and not to remove dissolved nitrogen dioxide and dinitrogen tetroxide from an aqueous nitric acid solution using substantially clean air.

DE 4034752 A1 (Curtius, 7 May 1992) discloses a similar countercurrent gas-liquid contact column comprising packings which can be structured packings; a liquid distributor located above the packing; an inlet line for optionally distributing diluted nitric acid to the packing and an acid outlet; and a gas inlet and outlet. The washing column does not disclose a liquid distributor according to the present invention, nor is used in a method according to the invention.

EP 2 295 375 A1 (Dietrich Process Systems GmbH, 16 Mar. 2011) discloses a stripping column comprising liquid distribution trays of the type "CORE-TRAY" and may comprise structured packings. The washing column is used with steam to remove sulphuric acid and nitric acid from a waste stream from the production of nitroaromatics, and does not disclose a liquid distributor according to the present invention, nor is used in a process according to the invention.

SUMMARY OF THE INVENTION

The present invention provides a vertical bleaching tower for removing dissolved nitrogen oxides from an aqueous nitric acid solution comprising said nitrogen oxides, using a stripping gas substantially devoid of nitrogen oxide gases such as air, nitrogen, oxygen or combinations thereof, in a process for producing nitric acid, comprising a structured packing; a liquid distributor comprising a feed box having a serrated weir for distribution of the aqueous nitric acid solution comprising the dissolved nitrogen oxides through upward-pointing serrations of the serrated weir into perforated trays of the liquid distributor and located above the structured packing for distributing the aqueous nitric acid solution comprising the dissolved nitrogen oxides to the structured packing; an inlet and outlet, both suitable for aqueous nitric acid solution; and an inlet and outlet, both suitable for the stripping gas. As defined herein, a gas "substantially devoid of nitrogen oxides gas" can mean a gas the content of which in nitrogen oxide gases is equal to or less than 5 weight %, or equal to or less than 2 weight %, or equal to or less than 0.4 weight %.

In the framework of this application, nitrogen oxides are meant to comprise at least nitrogen dioxide ($NO_2$) and dinitrogen tetroxide ($N_2O_4$). Both are gases at room temperature and ambient pressure and dissolve readily in water or an aqueous composition. Also, other nitrogen-oxygen species are regarded as nitrogen oxides within the ambit of this invention, such as nitrous acid ($HNO_2$), and which are also removed in the bleaching process. The aqueous nitric acid solution may contain up to 68% of nitric acid (azeotrope).

In one embodiment, the structured packing of the vertical bleaching tower has a surface area of at least 250 $m^2/m^3$, preferably 450-750 $m^2/m^3$.

In one embodiment, the liquid distributor of the vertical bleaching tower has preferably a drip-point density of at least 30 dripping points per $m^2$, preferably from 60-200 dripping points per $m^2$.

In one embodiment, the ratio between the height of the structured packing and the vertical bleaching tower diameter may be at least 1, preferably at least 1.5, more preferably at least 2.

The present invention further provides a bleaching method for removing dissolved nitrogen oxides from an aqueous nitric acid solution comprising said nitrogen oxides in a vertical bleaching tower according to the invention, in particular comprising a structured packing; a liquid distributor comprising a feed box having a serrated weir for distribution of the aqueous nitric acid solution comprising said nitrogen oxides through upward-pointing serrations of the serrated weir into perforated trays of the liquid distributor and located above the structured packing for distributing the aqueous nitric acid solution comprising said nitrogen oxides to the structured packing; an inlet and outlet, both suitable for aqueous nitric acid solution; and an inlet and outlet, both suitable for a stripping gas substantially devoid of nitrogen oxide gases, such as air, nitrogen, oxygen or combinations thereof, using a stripping gas substantially devoid of nitrogen oxide gases, such as air, nitrogen, oxygen or combinations thereof, to remove the dissolved nitrogen oxides from the aqueous nitric acid solution, comprising the steps of
- introducing the aqueous nitric acid solution in the top of the vertical bleaching tower though the liquid distributor;
- allowing the aqueous nitric acid solution to travel downwards into the vertical bleaching tower through the structured packing;
- contacting the aqueous nitric acid solution with the stripping gas moving in a counter-current direction to the aqueous nitric acid solution through the structured packing; and
- exiting the stripping gas comprising the removed nitrogen oxides.

In one embodiment, the bleaching process comprises the step of returning the removed nitrogen oxides to a compressor for nitrogen oxide gases located upstream an absorption tower, or directly to an absorption tower for subsequent conversion of the removed nitrogen oxides to nitric acid.

In one embodiment, the nitrogen oxides are nitrogen dioxide ($NO_2$) and dinitrogen tetroxide ($N_2O_4$).

In one embodiment, the stripping gas is moving in a counter-current direction to the aqueous nitric acid solution in the vertical bleaching tower and may be in an air/acid solution ratio of lower than 75 $m^3$ air/$m^3$ acid solution, preferably lower than 45 $m^3$ air/$m^3$ acid solution, more preferably lower than 30 $m^3$ air/$m^3$ acid solution, even more preferably lower than 20 $m^3$ air/$m^3$ acid solution.

In one embodiment, the pressure drop over the bleaching tower is preferably between 25 mbar and 65 mbar.

The present invention further provides a process for producing nitric acid, comprising oxidizing ammonia to produce nitric oxide; converting the nitric oxide to nitrogen oxides, in particular $NO_2$ and $N_2O_4$; absorbing the nitrogen oxides in water in an absorption tower to produce an aqueous nitric acid solution; removing dissolved nitrogen oxides from the aqueous nitric acid solution using the bleaching process according to the invention; and returning the removed nitrogen oxides to a compressor for nitrogen oxide gases located upstream an absorption tower, or directly to an absorption tower for subsequent conversion of the removed nitrogen oxides to nitric acid.

The invention further concerns the use of a vertical bleaching tower according to the invention for removing dissolved nitrogen oxides from an aqueous nitric acid solution in a process for producing nitric acid.

The invention further concerns the use, in a vertical bleaching tower for removing dissolved nitrogen oxides from an aqueous nitric acid solution in a process for producing nitric acid, of a structured packing in combination of a liquid distributor comprising a feed box having a serrated weir for distribution of the aqueous nitric acid solution through up-ward-pointing serrations of the serrated weir into perforated trays of the liquid distributor and located above the structured packing for distributing the aqueous nitric acid solution containing nitrogen oxides to the structured packing.

FIGURES

DETAILED DESCRIPTION OF THE INVENTION

Figure 1:
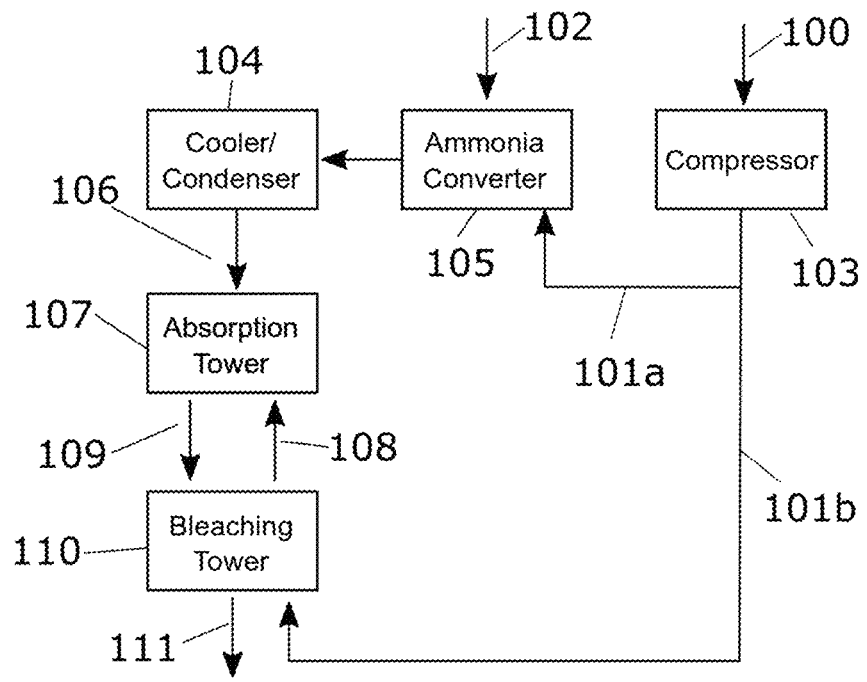
FIG. 1 is a simplified process flow diagram showing the process units of a conventional nitric acid plant.

The present invention relates to a vertical bleaching tower for removing dissolved nitrogen oxides from an aqueous nitric acid solution using a stripping gas substantially devoid of nitrogen oxide gases, such as air, nitrogen, oxygen or combinations thereof, in a process for producing nitric acid. As defined herein, a gas "substantially devoid of nitrogen oxides gas" is intended to mean a gas of which the content of nitrogen oxide gases is equal to or less than 5 weight %, or equal to or less than 2 weight %, or equal to or less than 0.4 weight %.

The vertical bleaching tower comprises a structured packing; a liquid distributor comprising a feed box having a serrated weir for distribution of the aqueous nitric acid solution through upward-pointing serrations of the serrated weir into perforated trays of the liquid distributor and located above the structured packing for distributing the aqueous nitric acid solution containing nitrogen oxides to the structured packing; an inlet and outlet, both suitable for aqueous nitric acid solution; and an inlet and outlet, both suitable for the stripping gas.

The present invention also relates to a bleaching method for removing dissolved nitrogen oxides from an aqueous nitric acid solution in a vertical bleaching tower according to the invention, using a stripping gas substantially devoid of nitrogen oxide gases, such as air, nitrogen, oxygen or combinations thereof, to remove dissolved nitrogen oxides from the aqueous nitric acid solution, comprising the steps of

- introducing the aqueous nitric acid solution comprising the dissolved nitrogen oxides in the top of the vertical bleaching tower though the liquid distributor;
- allowing the aqueous nitric acid solution to travel downwards into the vertical bleaching tower through the structured packing;
- contacting the aqueous nitric acid solution with the stripping gas moving in a counter-current direction to the aqueous nitric acid solution through the structured packing; and
- exiting the stripping gas comprising the removed nitrogen oxides.

The present invention also relates to a method for producing nitric acid.

The method comprises oxidizing ammonia to produce nitric oxide; converting the nitric oxide to nitrogen oxides, in particular $NO_2$ and $N_2O_4$; and absorbing the nitrogen oxides in water in an absorption tower to produce an aqueous nitric acid solution. The dissolved unreacted nitrogen oxides are removed from the aqueous nitric acid solution in a vertical bleaching tower according to the invention. In particular, the vertical bleaching tower comprises a structured packing; a liquid distributor comprising a feed box having a serrated weir for distribution of the aqueous nitric acid solution through upward-pointing serrations of the serrated weir into perforated trays of the liquid distributor and located above the structured packing for distributing the aqueous nitric acid solution containing nitrogen oxides to the structured packing; an inlet and outlet, both suitable for aqueous nitric acid solution; and an inlet and outlet, both suitable for a stripping gas substantially devoid of nitrogen oxide gases, such as air, nitrogen, oxygen or combinations thereof. In the vertical bleaching tower, the aqueous nitric acid solution is contacted with the stripping gas moving in a countercurrent direction to the aqueous nitric acid solution travelling downwards. The removed nitrogen oxides are returned to a compressor for nitrogen oxide gases, located upstream an absorption tower, or directly to an absorption tower for subsequent conversion of the removed nitrogen oxides to nitric acid.

The present invention further relates to use of a vertical bleaching tower according to the invention for removing dissolved nitrogen oxides from an aqueous nitric acid solution in a process for producing nitric acid.

When the stripping gas is air, primary air for the ammonia oxidation and secondary air to the bleaching tower are normally provided by an air compressor. The air moving in the counter-current direction to the aqueous nitric acid solution in the bleaching tower may be the secondary air.

FIG. 1 is a simplified schematic process flow diagram of a conventional nitric acid production plant, using air as the stripping gas. Ammonia is fed 102 to an ammonia converter 105. Air is fed 100 to a compressor 103. The compressed air from the air compressor 103 is split into a first 101a and a second 101b air flow. The first air flow 101a is fed as primary air to the ammonia converter 105, and the second air flow 101b is fed as secondary air to the bleaching tower 110. Ammonia is oxidized to NO in the ammonia converter 105. The NO is fed to the cooler/condenser 104. In the cooler/ condenser 104, the NO reacts with excess oxygen to form $NO_2$ and then the $NO_2$ reacts to form $N_2O_4$. The $NO_2$ and $N_2O_4$ are fed in line 106 to the absorption tower 107, where they are converted to nitric acid and an aqueous nitric acid solution is formed. The aqueous nitric acid solution is fed in line 109 to the bleaching tower 110, where dissolved nitrogen oxides causing a yellowish colour are removed from the aqueous nitric acid solution by intimately contacting the aqueous nitric acid solution with air 101b. The nitrogen oxides removed from the aqueous nitric acid solution are fed in line 108 from the bleaching tower 110 to the absorption tower 107 or optionally further up in the upstream process to be converted to nitric acid. Aqueous nitric acid solution from which the nitrogen oxides have been removed (i.e. bleached) leaves 111 the bottom of the vertical bleaching tower 110 as final aqueous nitric acid solution product.

Vertical bleaching towers are conventionally filled with trays and/or with random packing. The present invention relates to the use of structured packing in a vertical bleaching tower, in combination with a liquid distributor comprising a feed box having a serrated weir for distribution of the aqueous nitric acid solution through upward-pointing serrations of the serrated weir into perforated trays of the liquid distributor and located above the structured packing for distributing the aqueous nitric acid solution containing nitrogen oxides to the structured packing.

The invention provides a new vertical bleaching tower comprising structured packing in combination with a specific liquid distributor.

In the present invention, use of structured packing provides improved performance in both new and in existing vertical bleaching towers retrofitted with structured packing and the specific liquid distributor according to the invention, as is shown in the Examples. Retrofitting existing vertical bleaching towers may require adjustment of process parameters as needed to secure the most appropriate operation of the nitric acid production process.

Figure 2:
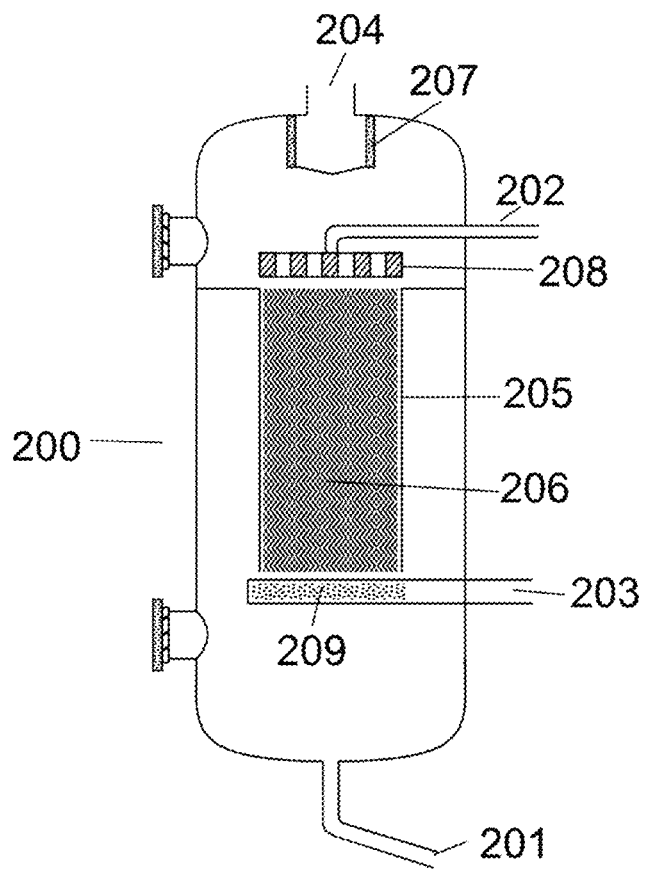
FIG. 2 shows schematically a vertical bleaching tower comprising a structured packing.

FIG. 2 shows schematically an example of a retrofitted vertical bleaching tower 200 for a nitric acid production process, using air as the stripping gas. This bleaching tower 200 has a bottom acid outlet 201, an upper acid inlet 202, a secondary air inlet 203, and a secondary air outlet 204. The acid inlet 202 is located above the liquid distributor 208. The bleaching tower has an inner tube 205 to reduce the original diameter of the tower. A new tower would have a smaller diameter and would not require such an inner tube 205. A structured packing 206 is located in the inner tube 205. A liquid distributor 208 is located above the structured packing 206. A demister 207 is normally located in the upper part of the bleaching tower 200. The secondary air inlet 203 and preferentially a perforated area 209 are located below the structured packing 206. The secondary air entering the bleaching tower 200 through the secondary air inlet 203 flows normally through the perforated area 209 before entering and flowing upwards in the structured packing 206. The secondary air passes normally through the demister 207 before leaving the bleaching tower 200 through the secondary air outlet 204.

The aqueous nitric acid solution is distributed into perforated liquid distributor trays through the serrated weir. The result is that the aqueous nitric acid solution is much better distributed through the perforated trays with this distribution system and the pressure drop is optimized. It is important to avoid corrosion of packing and channeling of gas and liquid flows. Loss of integrity of the packing elements results in loss of performance of the bleaching tower. Using titanium with a thickness of at least 0.1 mm or stainless steel with a thickness of 0.2 mm as the perforated tray material will minimize or avoid corrosion issues. Plastics, Teflon or other acid- and heat-tolerant materials may also be used as feed box and perforated tray material.

The advantages of using a liquid distributor having an upward-pointing serrated weir are that the distribution of the aqueous nitric acid solution into the perforated trays is optimized, the surface area (and as such the mass transfer) between the aqueous nitric acid solution and the stripping gas is optimized, the amount of stripping gas flow to the bleacher is kept minimal, and the pressure drop is optimized.

Figure 3:
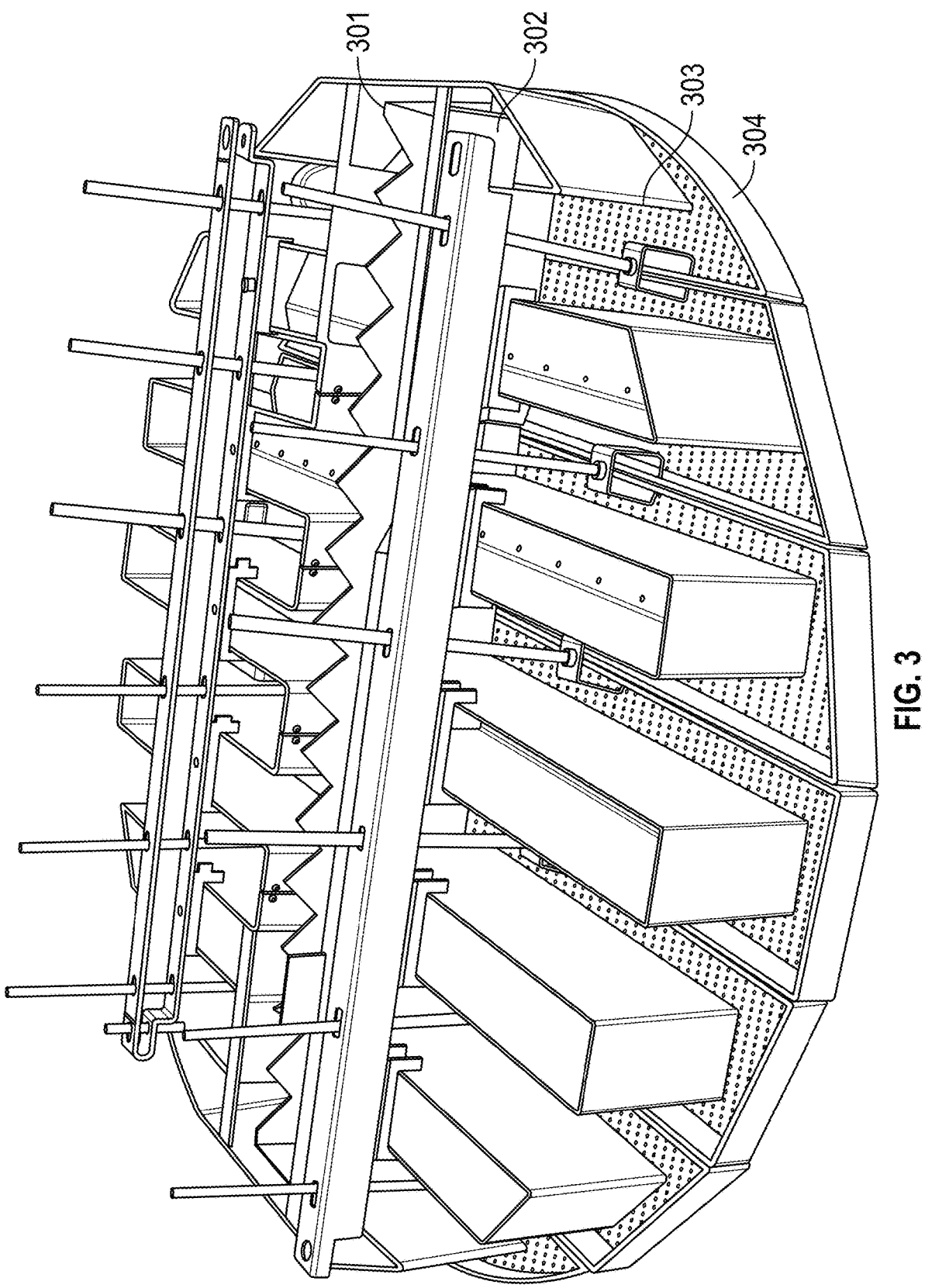
FIG. 3 is an image showing an example of a liquid distributor for use in combination with structured packing in a bleaching tower showing the upward-pointing serrated weir.

FIG. 3 is a picture showing a liquid distributor for use in combination with structured packing in a vertical bleaching tower of a nitric acid production process, according to the present disclosure. The liquid distributor comprises the following elements: serrated weir 301, feed box 302, tray(s) 303 and grid 304. The liquid distributor is placed on top of structured packing in a vertical bleaching tower in a column/tower of a chemical plant. The aqueous nitric acid solution is fed to the feed box 302. The aqueous nitric acid solution is distributed into the perforated trays through the serrated weir. There are many small holes in the bottom of the perforated trays. Thus, the distribution of the aqueous nitric acid solution into the perforated trays is optimized, the surface area between the aqueous nitric acid solution and the stripping gas is optimized, the amount of stripping gas flow to the bleacher is kept minimal, and the pressure drop is optimized.

Figure 4:
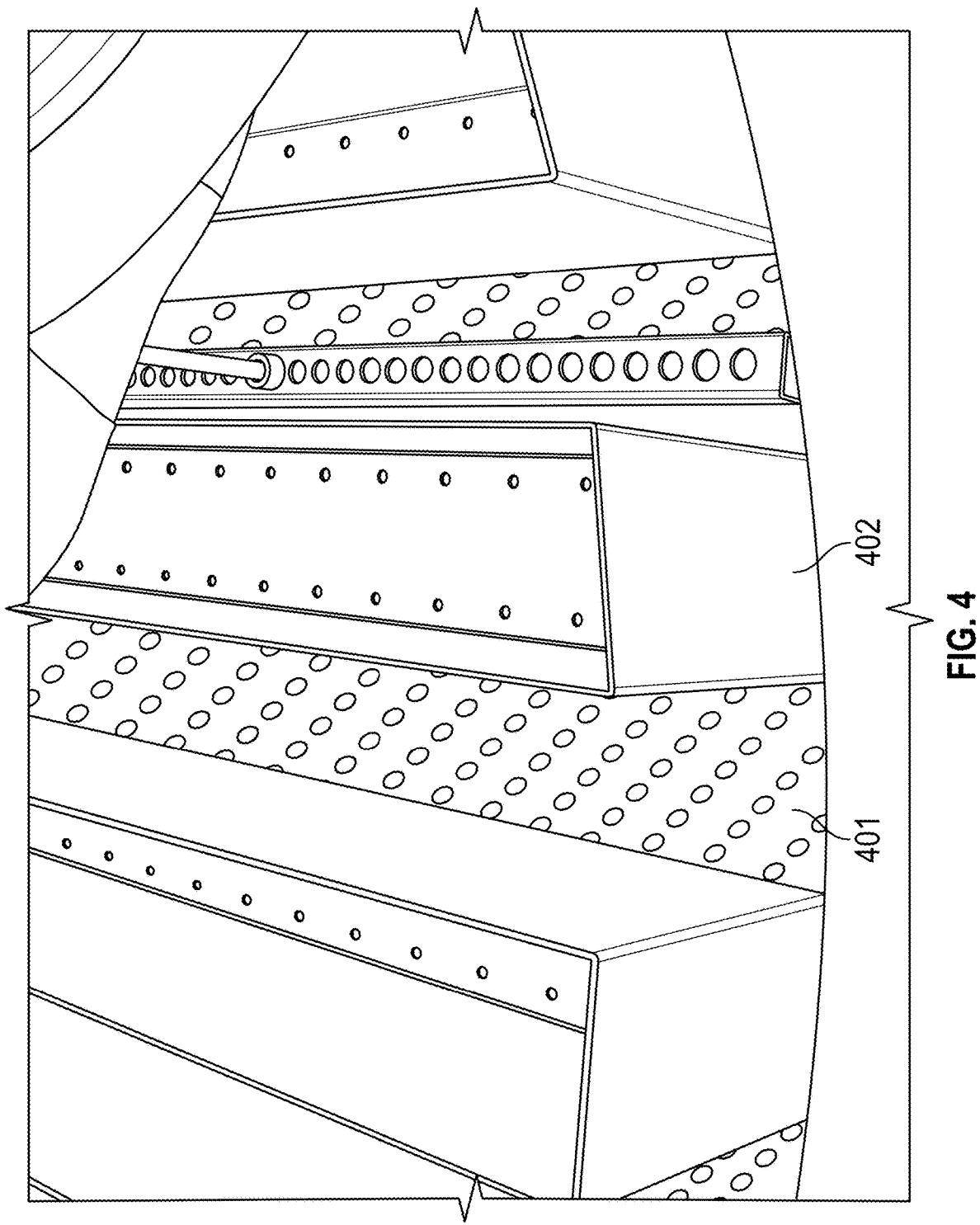
FIG. 4 is an image showing perforated trays of the liquid distributor placed directly on a structured packing in a vertical bleaching tower.

FIG. 4 is a picture showing perforated liquid distributor trays 402, where the perforated trays 402 are placed directly on a structured packing 401.

The liquid distributor comprises a feed box to receive the aqueous nitric acid solution entering the bleaching tower. The aqueous nitric acid solution is distributed from the feed box into perforated trays.

The feed box has upward-pointing serrated weir. The serrated weir may be located at one or both of the longitudinal edges of the feed box. The aqueous nitric acid solution is distributed from the feed box through the serrations and into the perforated trays. The use of the serrated weir and its positioning within the distributor will further contribute to the optimization of the mass transfer between the stripping gas and the aqueous nitric acid solution and/or to the reduction of the amount of stripping gas needed.

Various shapes of the serrations of the weirs may provide the same or similar effect, such as V-shaped, castellated shape, U-shaped serrations. By the term "serrated weir" it should be understood that this does not only comprise a sawtooth-shape, but also other non-linear shapes providing the same or similar distributing effect of the aqueous nitric acid solution.

In a further embodiment, the feed box may have holes in the bottom and/or the walls for distribution of aqueous nitric acid solution to the perforated trays. The holes may be circular, or may have the shape of vertical or horizontal slits.

The bottom of the feed box may be located at a higher location than the perforated trays. In another embodiment, the bottom of the feed box may be located at the same height as the bottom of the perforated trays. If the feed box comprises serrated weir, the serrations must be located higher than the upper edge of the perforated trays.

Perforated liquid distribution trays can be placed on support grids or directly on a structured packing.

The liquid distributor of the vertical bleaching tower may have a drip-point density of at least 30 dripping points per $m^2$, preferably from 60-200 dripping points per $m^2$.

Compared to random packing or fractionation trays, the uniform arrangement of structured packing provides a number of advantages such as lower pressure drop through the column, higher capacity, higher efficiency in the same tower height, excellent liquid spreading characteristics, and reduced liquid hold-up.

Each type of structured packing has specific performance characteristics. In specific applications or under certain conditions, each type of structured packing provides a particular benefit that may make one configuration more desirable than other configuration.

Achieving good contact between the liquid and vapor phases in a structured packing is important. A packing that spreads the liquid uniformly in a thin film will exhibit better performance. Turbulence that enhances the mass transfer is created by mixing the film.

When using structured packing and air as the stripping gas in bleaching towers in a nitric acid production process, the surface area is improved to 450-750 $m^2/m^3$ from 250 $m^2/m^3$ of aqueous nitric acid solution as with conventional packing. This results in reduction of the air flow needed from more than 100 $m^3$ air/$m^3$ aqueous nitric acid solution to about 45 $m^3$ air/$m^3$ aqueous nitric acid solution. The air not used in the bleaching stage with structured packing can be used instead in the burner where ammonia is oxidized to nitrogen monoxide, as long as the oxygen level in the tail gas remains sufficient.

When using air as the stripping gas, it is important to optimize use of compressed air. The total air from the air compressor is split between the burner as primary air and the bleacher as secondary air. If the air flow to the bleacher can be reduced, more air will be available as primary air and thus increase acid production.

EXAMPLES

The combination of structured packing and liquid distributor is retrofitted in a number of the inventor's bleaching towers (A to D) using air as the stripping gas, and shows a substantial improvement in the nitric acid process with regard to secondary air reduction obtained and increased acid production compared to original design of the towers with sieve tray or metal rings unstructured packing. The results are shown in Table 1 below. The structured packing equipped with the serrated liquid distributors were obtained from Sulzer (Winterthur, Switzerland).

TABLE 1

| | | Bleaching towers | | | |
|---|---|---|---|---|---|
| | Unit | A | B | C | D |
| Tower diameter | m | 0.82 | 2.5 | 1.4 | 1.8 |
| Packing height | m | 4.104 | 2.556 | 2.556 | 2.556 |
| Absorption pressure | bar | 4.86 | 10.6 | 9.95 | 10.5 |
| Secondary air pressure | bar | 6.08 | 5.05 | 4.7 | 4.3 |
| Air/acid ratio | | 73.2 | 55.0 | 55.0 | 45.8 |
| Secondary air reduction obtained | % | 34.4 | 47.0 | 38.1 | 62.6 |
| Increased acid production | % | 5.9 | 7.5 | 6.5 | 8.5 |

As a reference for the improvements, some data for the original bleaching towers are given below:

| | A | B | C | D |
|---|---|---|---|---|
| Tray or packing type | Packing, metal rings unstructured packing | Sieve tray | Sieve trays | Sieve trays |
| Tower diameter [m] | 1.2 | 3.4 | 2.3 | 2.6 |
| Packing height or total sieve tray height [m] | 4.0 | 3.2 | 3.2 | 3.2 |
| Number of trays | | 5 | 5 | 5 |
| Air/acid ratio | 112.9 | 133.2 | 84.1 | 103.6 |

The results clearly show improvement in increased acid production. Further, the reduction of secondary air is remarkable.

In addition, the solution of the present invention provides a better quality of the acid, i.e. a lower level of $HNO_2$ in the nitric acid. The surface area between the aqueous nitric acid solution and the air is optimized. The amount of air flow to the bleaching tower is kept minimal. The use of titanium and a minimum thickness of 0.1 mm (titanium) or 0.2 mm (stainless steel) as the structured packing material avoids corrosion issues. The pressure drop is kept minimal.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the gist or scope of the applicant's general inventive concept.

The invention claimed is:

1. A vertical bleaching tower for removing dissolved nitrogen oxides from an aqueous nitric acid solution comprising said nitrogen oxides, using a stripping gas substantially devoid of nitrogen oxide gases, selected from air, nitrogen, oxygen or combinations thereof, in a process for producing nitric acid, the vertical bleaching tower comprising:
   a structured packing;
   a liquid distributor comprising a feed box having a serrated weir for distribution of the aqueous nitric acid solution comprising the dissolved nitrogen oxides through upward-pointing serrations of the serrated weir into perforated trays of the liquid distributor and located above the structured packing for distributing the aqueous nitric acid solution comprising the dissolved nitrogen oxides to the structured packing;
   an aqueous nitric acid solution inlet;
   an aqueous nitric acid solution outlet;
   a stripping gas inlet; and
   a stripping gas outlet.

2. A vertical bleaching tower for removing dissolved nitrogen oxides from an aqueous nitric acid solution comprising said nitrogen oxides, using a stripping gas substantially devoid of nitrogen oxide gases, selected from air, nitrogen, oxygen or combinations thereof, in a process for producing nitric acid, the vertical bleaching tower comprising:

a structured packing;

a liquid distributor comprising a feed box having a serrated weir for distribution of the aqueous nitric acid solution comprising the dissolved nitrogen oxides through upward-pointing serrations of the serrated weir into perforated trays of the liquid distributor and located above the structured packing for distributing the aqueous nitric acid solution comprising the dissolved nitrogen oxides to the structured packing;

an aqueous nitric acid solution inlet;

an aqueous nitric acid solution outlet;

a stripping gas inlet; and a stripping gas outlet, wherein the structured packing has a surface area of at least 250 $m^2/m^3$.

3. The vertical bleaching tower according to claim 1, wherein the liquid distributor has a drip-point density of at least 30 dripping points per $m^2$.

4. The vertical bleaching tower of claim 1, wherein the ratio between the height of the structured packing and the vertical bleaching tower diameter is at least 1.

5. A bleaching method for removing dissolved nitrogen oxides from an aqueous nitric acid solution comprising said nitrogen oxides in a vertical bleaching tower according to claim 1, using a stripping gas substantially devoid of nitrogen oxide gases, selected from air, nitrogen, oxygen or combinations thereof, to remove dissolved nitrogen oxides from the aqueous nitric acid solution, comprising the steps of introducing the aqueous nitric acid solution comprising the dissolved nitrogen oxides in the top of the vertical bleaching tower through the liquid distributor;

allowing the aqueous nitric acid solution to travel downwards into the vertical bleaching tower through the structured packing;

contacting the aqueous nitric acid solution with the stripping gas moving in a counter-current direction to the aqueous nitric acid solution through the structured packing; and exiting the stripping gas comprising the removed nitrogen oxides.

6. The method according to claim 5, further comprising the step of returning the removed nitrogen oxides to a compressor for nitrogen oxide gases, located upstream an absorption tower, or directly to an absorption tower for subsequent conversion of the removed nitrogen oxides to nitric acid.

7. The method according to claim 5, wherein the nitrogen oxides are nitrogen dioxide ($NO_2$) and dinitrogen tetraoxide ($N_2O_4$).

8. The method according to claim 5, wherein the stripping gas is air moving in a counter-current direction to the aqueous nitric acid solution and is in an air/acid solution ratio of lower than 75 $m^3$ air/$m^3$ acid solution.

9. The method according to claim 5, wherein the pressure drop over the vertical bleaching tower is between 25 mbar and 65 mbar.

10. The vertical bleaching tower according to claim 2 wherein the structured packing surface area is 450 to 750 $m^2/m^3$.

11. The vertical bleaching tower according to claim 3 wherein the liquid distributor drip-point density is from 60-200 dripping points per $m^2$.

12. The vertical bleaching tower according to claim 4 wherein the ratio between the height of the structured packing and the vertical bleaching tower diameter is at least 1.5.

13. The vertical bleaching tower according to claim 12 wherein the ratio between the height of the structured packing and the vertical bleaching tower diameter is at least 2.

14. The method according to claim 8 wherein the air/acid solution ratio is lower than 45 $m^3$ air/$m^3$ acid solution.

15. The method according to claim 14 wherein the air/acid solution ratio is lower than 30 $m^3$ air/$m^3$ acid solution.

16. The method according to claim 15 wherein the air/acid solution ratio is lower than 20 $m^3$ air/$m^3$ acid solution.

* * * * *